(12) United States Patent
Jerschow

(10) Patent No.: US 7,271,341 B2
(45) Date of Patent: Sep. 18, 2007

(54) CABLE COMPONENTS OF SILICONE COMPRISING GLASS FIBERS

(75) Inventor: Peter Jerschow, Burghausen (DE)

(73) Assignee: Wacker Chemie AG, Munich (DE)

( * ) Notice: Subject to any disclaimer, the term of this patent is extended or adjusted under 35 U.S.C. 154(b) by 64 days.

(21) Appl. No.: 11/112,805

(22) Filed: Apr. 22, 2005

(65) Prior Publication Data

US 2005/0247469 A1    Nov. 10, 2005

(30) Foreign Application Priority Data

May 10, 2004   (DE) ............... 10 2004 022 992

(51) Int. Cl.
*H01B 7/00*    (2006.01)
(52) U.S. Cl. ............... 174/110 R; 174/120 R; 174/122 R; 174/122 G
(58) Field of Classification Search .......... 174/36, 174/110 R, 110 A–110 E, 120 R, 121 SR, 174/120 C, 120 SC, 121 R, 122 R, 124 G, 174/124 GC
See application file for complete search history.

(56) References Cited

U.S. PATENT DOCUMENTS

| | | | | |
|---|---|---|---|---|
| 2,306,781 A | * | 12/1942 | Francis, Jr. .................. | 428/198 |
| 3,273,225 A | * | 9/1966 | Saums et al. .................. | 29/605 |
| 3,861,926 A | * | 1/1975 | Irlam et al. .................... | 501/38 |
| 3,862,065 A | | 1/1975 | Yokokawa et al. | |
| 3,870,987 A | * | 3/1975 | Wiley et al. .................. | 338/214 |
| 3,962,524 A | * | 6/1976 | Miyamoto et al. ........... | 428/435 |
| 4,064,098 A | * | 12/1977 | Saitoh et al. ................. | 524/539 |
| 4,184,995 A | * | 1/1980 | Noble .......................... | 524/398 |
| 4,201,151 A | * | 5/1980 | Maklad et al. ............... | 118/642 |
| 4,279,783 A | * | 7/1981 | Kehrer et al. ................ | 252/511 |
| 4,514,466 A | * | 4/1985 | Leon et al. ................... | 428/383 |
| 4,631,098 A | * | 12/1986 | Pithouse et al. .............. | 156/86 |
| 4,803,103 A | * | 2/1989 | Pithouse et al. ........... | 428/34.5 |
| 4,963,610 A | * | 10/1990 | Schmid et al. .............. | 524/436 |
| 4,970,255 A | * | 11/1990 | Reimann et al. ............ | 524/321 |
| 5,057,151 A | | 10/1991 | Schuster et al. | |
| 5,082,995 A | * | 1/1992 | Paterson et al. ......... | 174/113 R |
| 5,134,959 A | * | 8/1992 | Woodmansee et al. ...... | 118/308 |
| 5,229,176 A | * | 7/1993 | Freeman ..................... | 428/34.7 |
| 5,366,771 A | * | 11/1994 | Beersel et al. .............. | 428/34.9 |
| 5,374,780 A | * | 12/1994 | Pazdirek ...................... | 174/176 |

(Continued)

FOREIGN PATENT DOCUMENTS

| | | |
|---|---|---|
| EP | 0 635 542 | 1/1995 |
| EP | 1 006 144 A2 | 6/2000 |
| FR | 2 335 560 | 12/1976 |

OTHER PUBLICATIONS

Derwent Abstract corresponding to EP 1 006 144 [AN 2000-389246].
Derwent Abstract corresponding to FR 2 335 560 [AN 1977-41743Y].

*Primary Examiner*—William H. Mayo, III
(74) *Attorney, Agent, or Firm*—Brooks Kushman P.C.

(57) ABSTRACT

Cable components of silicone elastomer contain glass fibers having an average length of at least 1 m. The cable components retain substantial strength when exposed to heat or fire.

20 Claims, 1 Drawing Sheet

U.S. PATENT DOCUMENTS

| | | | |
|---|---|---|---|
| 5,645,906 A * | 7/1997 | Park et al. | 428/36.3 |
| 5,679,456 A * | 10/1997 | Sakai et al. | 428/340 |
| 5,846,355 A * | 12/1998 | Spencer et al. | 156/53 |
| 5,892,873 A * | 4/1999 | Tatat | 385/107 |
| 6,165,396 A * | 12/2000 | Sato et al. | 264/45.3 |
| 6,255,594 B1 * | 7/2001 | Hudson | 174/121 A |
| 6,288,144 B1 * | 9/2001 | Roberts et al. | 523/217 |
| 6,387,518 B1 * | 5/2002 | Wolfer et al. | 428/447 |
| 7,026,377 B1 * | 4/2006 | Grant | 523/200 |
| 2002/0059706 A1 * | 5/2002 | Nomura et al. | 26/1 |
| 2003/0109623 A1 * | 6/2003 | Gornowicz et al. | 524/492 |
| 2003/0114575 A1 | 6/2003 | Teutsch | |

* cited by examiner

CABLE COMPONENTS OF SILICONE COMPRISING GLASS FIBERS

BACKGROUND OF THE INVENTION

1. Field of the Invention

The invention relates to cable components (K) of silicone elastomer which contains glass fibers, and the production of said components.

2. Background Art

U.S. Pat. No. 6,387,518 describes filled silicone rubber for safety cables. The silicone rubber may also contain glass fibers in addition to metal oxide. The silicone rubber-containing insulation burns in the event of a fire and, with the metal oxide, forms a ceramic which is electrically insulating. A short-circuit between the wires of the cable is thus prevented, and the function of the cable is maintained. The glass fibers are present as fillers. Usually, staple fibers in the size range of from less than 1 mm to not more than several cm are used as fillers. Such fillers have an adverse effect on the dielectric strength of the silicone rubber. Certain standards require increased flexibility of the cable in the event of a fire. However, in such events, the ceramic generally crumbles, and maintenance of function is not ensured.

The winding of mica tapes around wires for the purpose of mechanical strengthening is known. This method is extremely expensive and is not competitive with simple insulation with silicone rubber.

SUMMARY OF THE INVENTION

The invention relates to cable components (K) of silicone elastomer(s) which contain glass fibers having an average length of at least 1 m. The cable components (K) not only have improved mechanical properties of the silicone elastomer, e.g. increased tensile strength, but, in the event of a fire, form a mechanically stable ceramic which is electrically insulating, as a result of combustion of the silicone elastomer and reaction with the glass fibers. In particular the ceramic is less brittle since the glass fibers are incorporated into the ceramic and strengthen the ceramic, similarly to the case of steel reinforcements in reinforced concrete. In the extrusion of the cable components (K), the glass fibers can be simultaneously drawn into the silicone rubber. The extrusion speed is not reduced in the course thereof.

DETAILED DESCRIPTION OF THE PREFERRED EMBODIMENT(S)

Figure 1:
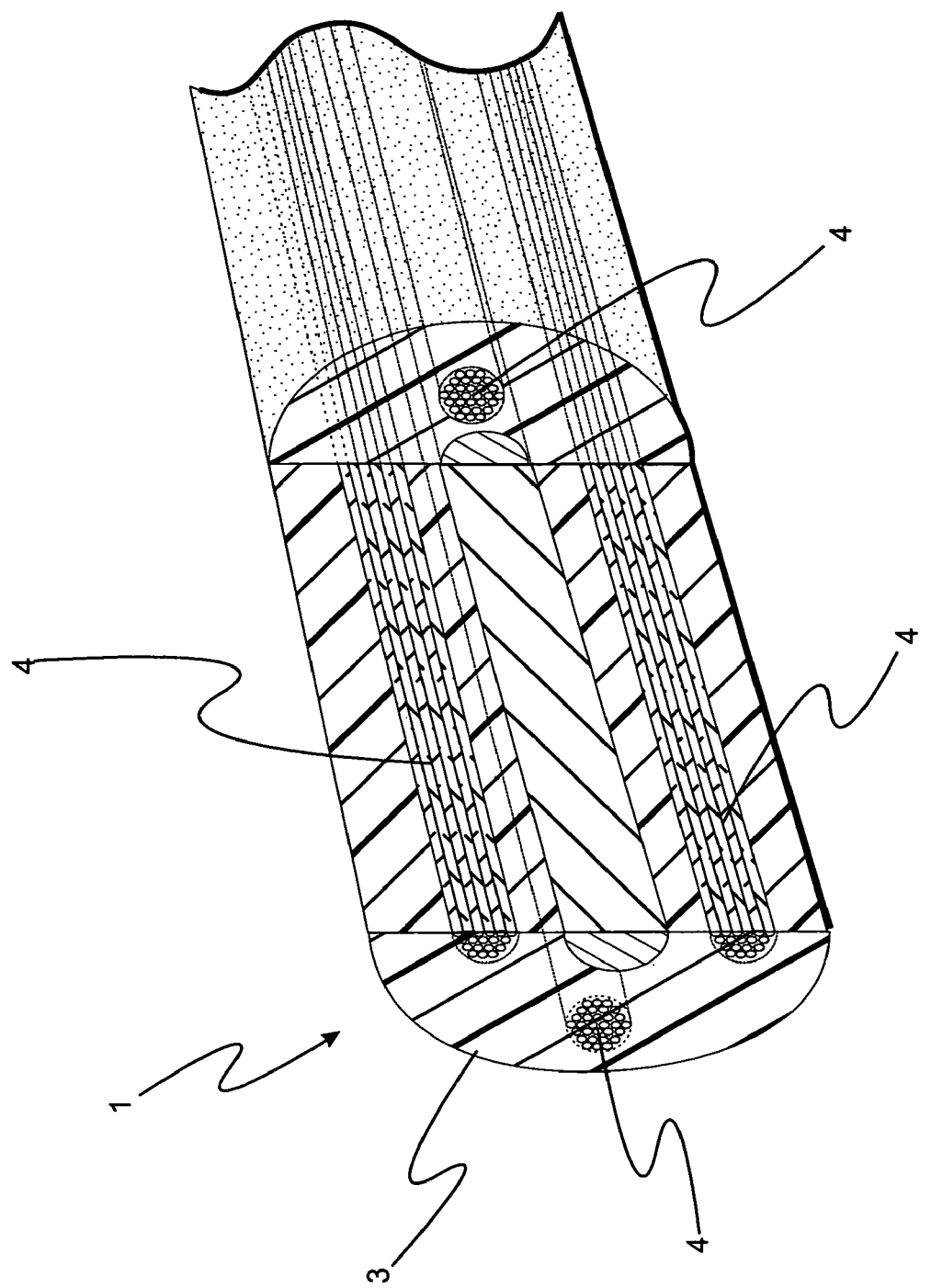
FIG. 1 illustrates a cable of the present invention.

The glass fibers may be present in any desired arrangement in the silicone rubber. The glass fibers are preferably arranged parallel or in spiral form relative to the conductor, and preferably have an average length of at least 10 m and may also be several km long.

Cable components (K) are, for example, the insulation covering around the conductor, protective covering, and outer sheath, as well as profiles which serve for fire protection, such as construction profiles.

The silicone elastomer is obtainable by crosslinking of silicone rubber. This may be peroxidically crosslinking, condensation crosslinking or addition crosslinking. Preferably, the silicone rubber is a peroxidically crosslinking silicone rubber material which preferably contains the following components:

Organopolysiloxane(s) (A) comprising units of the general formula I

in which

R are identical or different and are an optionally substituted hydrocarbon radical, r is 0, 1, 2 or 3 and has an average numerical value of from 1.9 to 2.1.

Examples of hydrocarbon radicals R are alkyl radicals such as the methyl, ethyl, n-propyl, isopropyl, n-butyl, isobutyl, tert-butyl, n-pentyl, isopentyl, neopentyl and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals, such as the n-decyl radical, dodecyl radicals such as the n-dodecyl radical, octadecyl radicals such as the n-octadecyl radical; cycloalkyl radicals such as the cyclopentyl, cyclohexyl, cycloheptyl, and methylcyclohexyl radicals; aryl radicals such as the phenyl, biphenyl, naphthyl, anthryl, and phenanthryl radicals; alkaryl radicals, such as the o-, m- and p-tolyl radicals, xylyl radicals, and ethylphenyl radicals; and aralkyl radicals such as the benzyl radical and the α- and the β-phenylethyl radicals.

Examples of substituted hydrocarbon radicals R are halogenated alkyl radicals such as the 3-chloropropyl, the 3,3,3-trifluoropropyl and the perfluorohexylethyl radical, and halogenated aryl radicals such as the p-chlorophenyl and the p-chlorobenzyl radical.

Further examples of radicals R are the vinyl, allyl, methallyl, 1-propenyl, 1-butenyl, 1-pentenyl, 5-hexenyl, butadienyl, hexadienyl, cyclopentenyl, cyclopentadienyl, cyclohexenyl, ethynyl, propargyl, and 1-propynyl radicals.

Radical R is preferably a hydrogen atom or a hydrocarbon radical having 1 to 8 carbon atoms, most preferably a methyl, phenyl or vinyl radical.

Preferably, alkyl radicals, in particular methyl radicals, are bonded to at least 70 mol %, in particular at least 90 mol %, of the Si atoms contained in the organopolysiloxane (A). If, in addition to Si-bonded methyl and/or 3,3,3-trifluoropropyl radicals, the organopolysiloxanes also contain Si-bonded vinyl and/or phenyl radicals, the amounts of the latter are preferably 0.001-30 mol %.

Preferably the organopolysiloxanes (A) predominantly comprise diorganosiloxane units, in particular at least 95 mol % of diorganosiloxane units. The terminal groups of the organopolysiloxanes may be trialkylsilyloxy groups, in particular the trimethylsilyloxy radical or the dimethylvinylsilyloxy radical; however, one or more of these alkyl groups may also be replaced by hydroxyl groups or alkoxy groups such as methoxy or ethoxy radicals. The organopolysiloxanes (A) may be liquids or highly viscous substances. The organopolysiloxanes (A) preferably have a viscosity of from $10^3$ to $10^8$ mm²/s at 25° C.

Peroxides, such as dibenzoyl peroxide, bis(2,4-dichlorobenzoyl) peroxide, dicumyl peroxide and 2,5-bis(tert-butylperoxy)-2,5-dimethylhexane and mixtures thereof are preferably used as crosslinking agents in the silicone rubber materials, bis(2,4-dichlorobenzoyl) peroxide and 2,5-bis(tert-butylperoxy)-2,5-dimethylhexane being preferred. Furthermore, a mixture of bis-4-methylbenzoyl peroxide (=PMBP) and 2,5-dimethyl-2,5-di(tert-butylperoxy)hexane (=DHBP) in the ratio 1:0.4 to 0.5:1, preferably in the ratio 1:0.4, is most preferably used as a crosslinking agent.

Furthermore, the silicone rubber materials preferably contain reinforcing and/or nonreinforcing fillers. Examples of reinforcing fillers are pyrogenic or precipitated silicas having BET surface areas of at least 50 $m^2/g$. Such silica fillers may have a hydrophilic character or may have been rendered water repellent by known methods. In this context, reference may be made, for example, to U.S. Pat. No. 5,057,151. In general, water repellency is imparted with from 1 to 20% by weight of hexamethyldisilazane and/or divinyltetramethyldisilazane and from 0.5 to 5% by weight of water, based in each case on the total weight of the organopolysiloxane material, these reagents advantageously being added in a suitable mixing apparatus, such as, for example, a kneader or internal mixer, to the organopolysiloxane (A) which is initially present, before the hydrophilic silica is gradually incorporated into the material.

Examples of nonreinforcing fillers are quartz powder, diatomaceous earth, calcium silicate, zirconium silicate, zeolites, metal oxide powders such as alumina, titanium oxide, iron oxide or zinc oxide, barium silicate, barium sulfate, calcium carbonate, gypsum, and plastic powders such as polyacrylonitrile powder or polytetrafluoroethylene powder. The BET surface area of these fillers is preferably less than 50 $m^2/g$.

The silicone rubber materials which can be crosslinked to give silicone elastomers preferably contain fillers in amounts of from 1 to 200 parts by weight, more preferably from 30 to 100 parts by weight, based in each case on 100 parts by weight of organopolysiloxane (A).

Depending on the respective application, additives such as processing auxiliaries, for example, plasticizers, ceramicizing metal compounds, pigments, and stabilizers such as heat stabilizers, can be added to the silicone rubber materials which can be vulcanized to give silicone elastomers.

Preferred ceramicizing metal compounds are metal oxides from the group consisting of magnesium oxide, alumina, tin oxide, calcium oxide, titanium oxide, barium oxide and metal compounds of this group in which oxides form on heating, boric acid, zinc borate and platinum complexes having at least one unsaturated group.

Examples of plasticizers which can be used as additives are polydimethylsiloxanes terminated with trimethylsilyl groups or hydroxyl groups and having a viscosity of not more than 1000 $mm^2/s$ at 25° C., or diphenylsilanediol.

Examples of heat stabilizers which can be used as additives are transition metal fatty acid salts such as iron octanoates, transition metal silanolates such as iron silanolate, and cerium(IV) compounds.

The silicone rubber preferably contains no further substances other than those previously mentioned, and can be prepared free of any specific additive or class of additives. The components used for the preparation of the silicone rubber may be, in each case, a single type of such a component as well as a mixture of at least two different types of such a component.

Conventional condensation-crosslinking organopolysiloxanes, as described, for example, in EP-A-359251, which is hereby incorporated by reference, or known addition-crosslinking materials, can also be used as silicone rubber.

The silicone rubber may contain platinum complexes which have at least one unsaturated group, preferably complexes such as, platinum-olefin complexes, platinum-aldehyde complexes, platinum-ketone complexes, platinum-vinylsiloxane complexes, platinum-1,3-divinyl-1,1,3,3-tetramethyldisiloxane complexes with or without a content of detectable organic halogen, platinum-norbornadiene-methylacetonate complexes, bis(gamma-picoline)platinum dichloride, trimethylenedipyridineplatinum dichloride, dicyclopentadienylplatinum dichloride, dimethylsulfoxydiethyleneplatinum(II) dichloride, reaction products of platinum tetrachloride with olefin and primary amine or secondary amine or primary and secondary amine, and reaction products of platinum tetrachloride dissolved in 1-octene with sec-butylamine, the platinum-1,3-divinyl-1,1,3,3-tetramethyldisiloxane complex being particularly preferred. This platinum complex is added in amounts of from 5 to 200 ppm, preferably from 10 to 100 ppm, the amount being based on pure platinum. Mixtures of the platinum complexes may also be used.

The invention furthermore relates to a process for the production of cable components (K), in which glass fibers having an average length of at least 1 m are extruded together with silicone rubber.

The glass fibers preferably become oriented in the extrusion direction. The extrusion speed need not be reduced as a result of the glass fibers being drawn in.

FIG. 1 illustrates one embodiment of a cable 1 containing a metal electrical conductor 2 surrounded by crosslinked silicone insulation 3. Parallel to the conductor 2 and embedded within the silicone insulation 3 are strands 4 of glass fibers.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A cable component of silicone elastomer containing glass fibers having an average length of at least 1 m, said cable component prepared by the process of coextruding glass fibers and curable silicone elastomer, and curing said elastomer.

2. The cable component of claim 1, wherein glass fibers are arranged parallel or in spiral form relative to a conductor in a cable of which the cable component is a part.

3. The cable component of claim 2, which comprises an insulation covering around a conductor, a protective covering, or an outer sheath.

4. The cable component of claim 3, wherein the silicone elastomer is obtained by crosslinking of a crosslinkable silicone rubber which is peroxidically crosslinkable, condensation crosslinkable or addition crosslinkable.

5. The cable component of claim 2, wherein the silicone elastomer is obtained by crosslinking of a crosslinkable silicone rubber which is peroxidically crosslinkable, condensation crosslinkable or addition crosslinkable.

6. The cable component of claim 1, which comprises an insulation covering around a conductor, a protective covering, or an outer sheath.

7. The cable component of claim 6, wherein the silicone elastomer is obtained by crosslinking of a crosslinkable silicone rubber which is peroxidically crosslinkable, condensation crosslinkable or addition crosslinkable.

8. The cable component of claim 1, wherein the silicone elastomer is obtained by crosslinking of a crosslinkable silicone rubber which is peroxidically crosslinkable, condensation crosslinkable or addition crosslinkable.

9. The cable component of claim 1 wherein the silicone rubber is obtained by crosslinking a peroxidically crosslinkable silicone composition or a condensation crosslinkable composition, in each case containing a platinum complex.

10. The cable component of claim 9, further comprising a reinforcing particulate filler.

11. The cable component of claim 9 further comprising a ceramicizing metal compound.

12. The cable component of claim 9, wherein said crosslinkable silicone composition is a condensation crosslinkable silicone composition.

13. The cable of claim 1, wherein said glass fibers have an average length of at least 10 m.

14. A process for the production of a cable component, wherein glass fibers having an average length of at least 1 m are extruded together with a crosslinkable silicone rubber, and the crosslinkable silicone rubber is crosslinked to form a silicone rubber.

15. The process of claim 14, wherein said glass fibers have an average length of at least 10 m.

16. The process of claim 14, wherein said glass fibers and said crosslinkable silicone rubber are coextruded around at least one conductor to form a wire cable.

17. The process of claim 16, wherein said glass fibers are coextruded parallel to the extrusion direction or in the form of a spiral generally parallel to the extrusion direction.

18. The process of claim 16, wherein the glass fibers have an average length greater than 10 m.

19. The process of claim 14, wherein said glass fibers are coextruded parallel to the extrusion direction or in the form of a spiral generally parallel to the extrusion direction.

20. The process of claim 14, wherein the glass fibers have an average length greater than 10 m.

* * * * *